(12) United States Patent  (10) Patent No.: US 8,875,595 B2
Barcin  (45) Date of Patent: Nov. 4, 2014

(54) OPERATING MECHANISM FOR A PARKING BRAKE

(75) Inventor: Baris Barcin, Leinfelden-Echterdingen (DE)

(73) Assignee: Dietz-automotive GmbH & Co. KG, Dettingen/Teck (DE)

( * ) Notice: Subject to any disclaimer, the term of this patent is extended or adjusted under 35 U.S.C. 154(b) by 705 days.

(21) Appl. No.: 12/785,904

(22) Filed: May 24, 2010

(65) Prior Publication Data

US 2010/0294076 A1 Nov. 25, 2010

(30) Foreign Application Priority Data

May 23, 2009 (DE) .......................... 10 2009 022 460

(51) Int. Cl.
G05G 1/04 (2006.01)
B60T 7/10 (2006.01)

(52) U.S. Cl.
CPC ..................................... B60T 7/102 (2013.01)
USPC .......................................................... 74/523

(58) Field of Classification Search
USPC ............ 74/519, 523, 534–538, 543; 188/2 D, 188/72.1, 72.9, 73.32
See application file for complete search history.

(56) References Cited

U.S. PATENT DOCUMENTS

| | | | |
|---|---|---|---|
| 935,581 A * | 9/1909 | Bowman | 74/537 |
| 2,168,567 A | 8/1939 | Gould | |
| 2,808,734 A | 10/1957 | Ortner | |
| 3,109,320 A | 11/1963 | Krautwurst | |
| 3,310,995 A | 3/1967 | Buchwald | |
| 3,580,104 A | 5/1971 | Yashiro et al. | |
| 3,901,100 A | 8/1975 | Iida et al. | |
| 4,212,211 A | 7/1980 | Rickert | |
| 4,280,741 A | 7/1981 | Stoll | |
| 4,311,060 A | 1/1982 | Kawaguchi et al. | |
| 4,403,524 A | 9/1983 | Gurney | |
| 4,515,036 A * | 5/1985 | Dotson | 74/535 |
| 5,247,850 A | 9/1993 | Lenzke | |
| 5,272,935 A | 12/1993 | Heinemann et al. | |
| 5,448,928 A * | 9/1995 | Harger | 74/523 |
| 5,560,082 A * | 10/1996 | Vetter | 16/429 |

(Continued)

FOREIGN PATENT DOCUMENTS

DE 3103658 A1 9/1982
DE 3709418 A1 9/1988

(Continued)

OTHER PUBLICATIONS

Translation of JP 56-39356, obtained on Nov. 14, 2013.*

(Continued)

Primary Examiner — James Pilkington
Assistant Examiner — Brian McGovern
(74) Attorney, Agent, or Firm — Venable LLP; Robert Kinberg; George L. Howarah

(57) ABSTRACT

An operating mechanism for a parking brake. The operating mechanism includes a manual brake lever pivotably coupled to a bearing block by a tubular holder. The manual brake lever is fixed to the tubular holder. The mechanism also includes a locking device adapted to fix the manual brake lever in a predetermined pivoting position, an activation rod guided inside the manual brake lever and operatively connected to the locking device, and a transfer element connected to the tubular holder. The transfer element is adapted to transmit movement of the manual lever to the parking brake.

6 Claims, 5 Drawing Sheets

(56) References Cited

U.S. PATENT DOCUMENTS

| | | | |
|---|---|---|---|
| 5,645,155 | A | 7/1997 | Houghton |
| 5,699,698 | A | 12/1997 | Geyer |
| 5,735,178 | A | 4/1998 | Barbunopulos |
| 5,907,977 | A | 6/1999 | Huebner et al. |
| 5,950,496 | A | 9/1999 | Rampp |
| 5,992,264 | A * | 11/1999 | Brock, Sr. .................. 74/502.6 |
| 6,016,718 | A | 1/2000 | Park et al. |
| 6,286,389 | B1 | 9/2001 | Papadatos |
| 6,837,127 | B2 * | 1/2005 | Schumacher .................. 74/512 |
| 6,915,719 | B2 | 7/2005 | Joo |
| 6,973,852 | B2 | 12/2005 | Shin et al. |
| 7,140,476 | B2 | 11/2006 | Hilss et al. |
| 7,152,508 | B2 * | 12/2006 | McCalley et al. ............ 81/53.2 |
| 7,475,615 | B2 * | 1/2009 | Revelis .......................... 74/523 |
| 7,526,981 | B2 | 5/2009 | Ferenc |
| 7,779,723 | B2 | 8/2010 | Kim |
| 8,230,757 | B2 | 7/2012 | Nocko et al. |
| 2003/0177856 | A1 | 9/2003 | Reese et al. |
| 2006/0175157 | A1 | 8/2006 | Villa et al. |
| 2007/0175291 | A1 | 8/2007 | Kim |
| 2010/0005922 | A1 | 1/2010 | Holland et al. |
| 2010/0294075 | A1 | 11/2010 | Barcin |
| 2010/0300241 | A1 | 12/2010 | Barcin |

FOREIGN PATENT DOCUMENTS

| | | | |
|---|---|---|---|
| DE | 3820978 | | 12/1989 |
| DE | 195-21-159 | A1 | 12/1996 |
| DE | 195-21-159 | A1 | 12/1996 |
| DE | 196-40-720 | A1 | 9/1997 |
| DE | 19954813 | A1 | 5/2001 |
| DE | 100-06-827 | A1 | 9/2001 |
| DE | 10-2005-057-037 | A1 | 6/2007 |
| EP | 476208 | A1 | 3/1992 |
| EP | 790165 | A1 | 8/1997 |
| EP | 1127760 | A2 | 8/2001 |
| EP | 1273495 | A2 | 1/2003 |
| JP | 56039356 | A * | 4/1981 .............. F16H 53/00 |

OTHER PUBLICATIONS

German Office Action issued in related German Application No. 10 2009 022 460.2 dated Feb. 22, 2010, plus English translation.

German Office Action issued in related German Application No. DE 10 2009 022 656.7 dated Feb. 22, 2010, plus English Translation.

German Office Action issued in related German Application No. 10 2009 022 461.0-21 dated Apr. 6, 2010, plus English Translation.

\* cited by examiner

OPERATING MECHANISM FOR A PARKING BRAKE

CROSS-REFERENCE TO RELATED APPLICATIONS

This application claims priority under 35 U.S.C. §119 to German Patent Application No. 10 2009 022 460.2, filed in Germany on May 23, 2009, the entire subject matter of which is expressly incorporated herein by reference.

BACKGROUND OF THE INVENTION

The invention relates to an operating mechanism for a parking brake.

An operating mechanism of this type is known from German Document DE 195 21 159 C2. This operating mechanism comprises a manual brake lever which is positioned pivoting in a bearing block. The manual brake lever can be set in various positions for activating the parking brake with the aid of a locking device. The locking device may comprise a locking segment and a detent which can be activated by an activation rod.

The manual brake lever comprises two lever side parts embodied as shells. On the inside, these shells have formed-on parts which permit the positioning of the locking device as well as the activation rod. A handle that must be fitted onto the shells is furthermore provided as an additional component of the manual brake lever. The activation rod in this case is guided inside a tubular, formed-on part of the shells located in the handle.

Bearing bushings with a bearing tube guided therein are installed into the shell halves for the manual brake lever. With its longitudinal ends, this bearing tube engages in circular openings in the bearing block, thus allowing a pivoting movement of the manual brake lever on the bearing block.

The disadvantage of this arrangement is that the operating mechanism comprises a plurality of individual parts which require a relatively involved assembly.

SUMMARY OF THE INVENTION

It is an object of the present invention to provide an operating mechanism of the aforementioned type which has a compact design and can be produced efficiently.

According to an illustrative embodiment, this object may be solved with an operating mechanism for a parking brake, the operating mechanism comprising: a manual brake lever pivotably coupled to a bearing block by a tubular holder, wherein the manual brake lever is fixed to the tubular holder; a locking device adapted to fix the manual brake lever in a predetermined pivoting position; an activation rod guided inside the manual brake lever and operatively connected to the locking device; and a transfer element connected to the tubular holder, wherein the transfer element is adapted to transmit movement of the manual lever to the parking brake.

The operating mechanism for a parking brake according to the invention comprises a manual brake lever, which is positioned pivoting on a bearing block and can be locked in place in a predetermined pivoting position with the aid of a locking device. The operating mechanism furthermore comprises an activation rod, guided inside the manual brake lever and operatively connected to the locking device. The pivoting bearing is formed with a tubular holder, which is positioned rotating on the bearing block, is fixedly connected to the manual brake lever and is provided with a transmission element for transmitting the pivoting position of the manual brake lever to the parking brake.

The inventive operating mechanism includes a low number of individual parts and has a modular configuration that also permits the realization of different variants.

It is particularly advantageous that the bearing block, the tubular holder and in particular also the manual brake lever are each embodied integrally as one piece, thus permitting a particularly easy and fast assembly of the operating mechanism.

The tubular holder and the manual brake lever, which can be attached thereto, form an easy to assemble structural unit. It is advantageous that the tubular holder forms a holder for the transmission element which can be embodied as rope or cord, a lever or a rod. The structural unit created by affixing the manual brake lever to the tubular holder thus results in a fixed, spatially unchangeable relationship between the manual brake lever and the transmission element, thereby ensuring that the pivoting movement is transmitted to the transmission element for the operation of the parking brake.

It is particularly advantageous if the manual brake lever is provided with an opening into which an extension on a longitudinal end of the tubular holder can be pressed.

The connection created by pressing the tubular holder into the manual brake lever can be created easily and quickly.

To create this press-fit connection, the edge that delimits the opening of the manual brake lever and the outer surface of the projection function as press-fit surfaces.

It is particularly advantageous if the press-fit surfaces of the projection and the opening are not radially symmetrical, so that the manual brake lever can be inserted only in a specified, desired position into the tubular holder.

Owing to this geometric structural guideline, it is avoided that during the production and assembly of the operating mechanism, the manual brake lever is pressed in an incorrect position into the tubular holder.

According to a particularly advantageous embodiment of the invention, the edge of the manual brake lever opening forms two press-fit surfaces which adjoin in the center of the opening and have mirror-symmetrical inclinations toward the center of the opening, such that the opening diameter increases, starting from the center toward the side edges.

As a result, the manual brake lever opening can optionally be pressed onto a tubular holder provided with a projection on the right or on the left longitudinal side end.

With this type of embodiment, it is particularly easy to realize different variants of the operating mechanism. In particular, different operating mechanisms for right-steering or left-steering motor vehicles can thus be produced particularly easily. Depending on whether the operating mechanism is produced for a right-steering or a left-steering motor vehicle, only a specific variant of the tubular holder must be selected for which the matching projection is affixed either on the right end or on the left end. However, the same manual brake lever can be used for both variants since it can optionally be pressed onto either variant of the tubular holder as a result of the two press-fit surfaces. This leads to a considerable reduction in parts for the variants. It is particularly advantageous that the bearing block is embodied such that the same bearing block can be used for both variants, which further reduces the number of parts for realizing the variants.

BRIEF DESCRIPTION OF THE DRAWINGS

These and other features and advantages of the invention will be further understood from the following detailed description of the preferred embodiments with reference to the accompanying drawings, showing in.

DETAILED DESCRIPTION OF THE PREFERRED EMBODIMENTS

Figure 1:
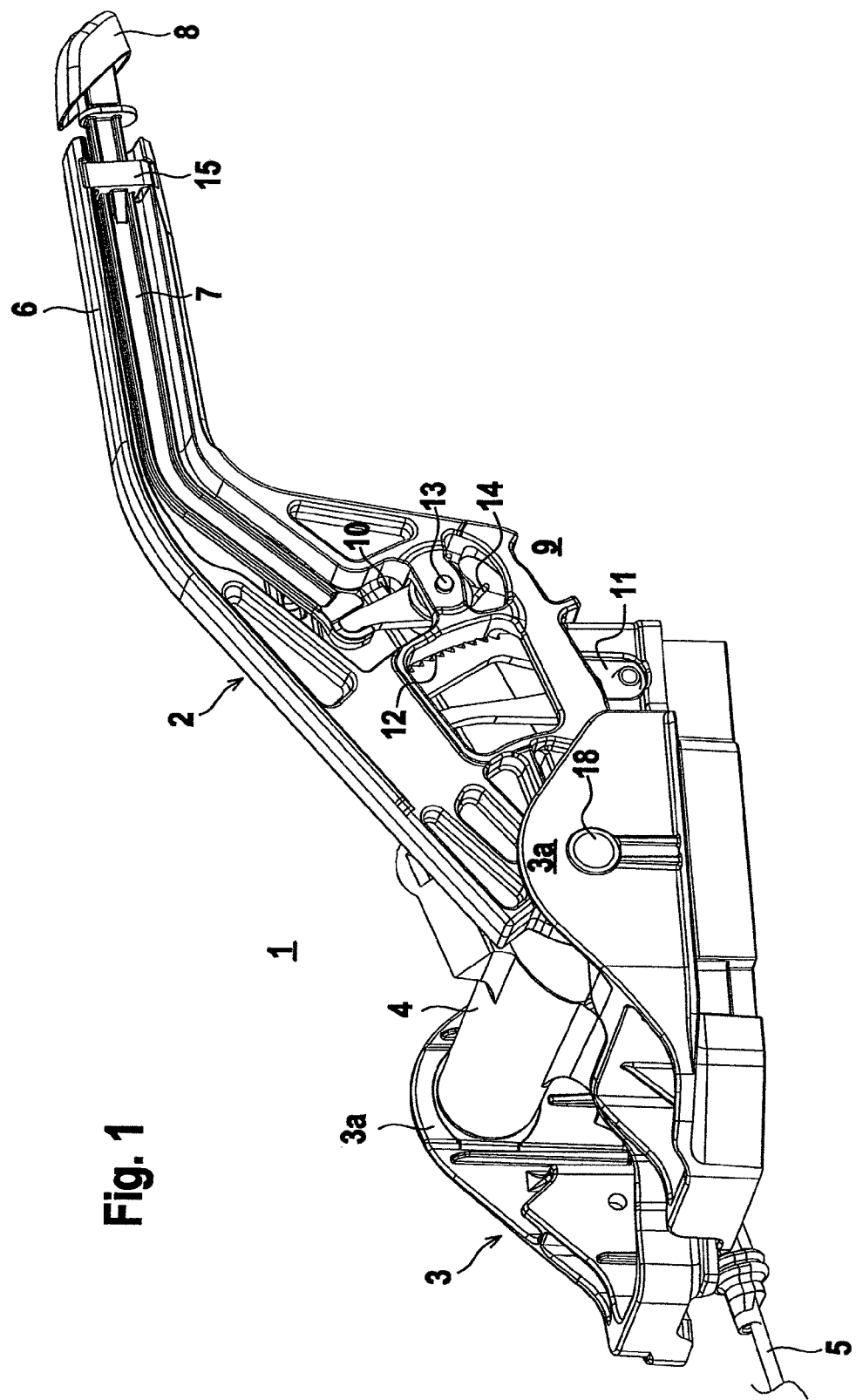
FIG. 1: A first view of an embodiment of an operating mechanism for a parking brake.
Figure 2:
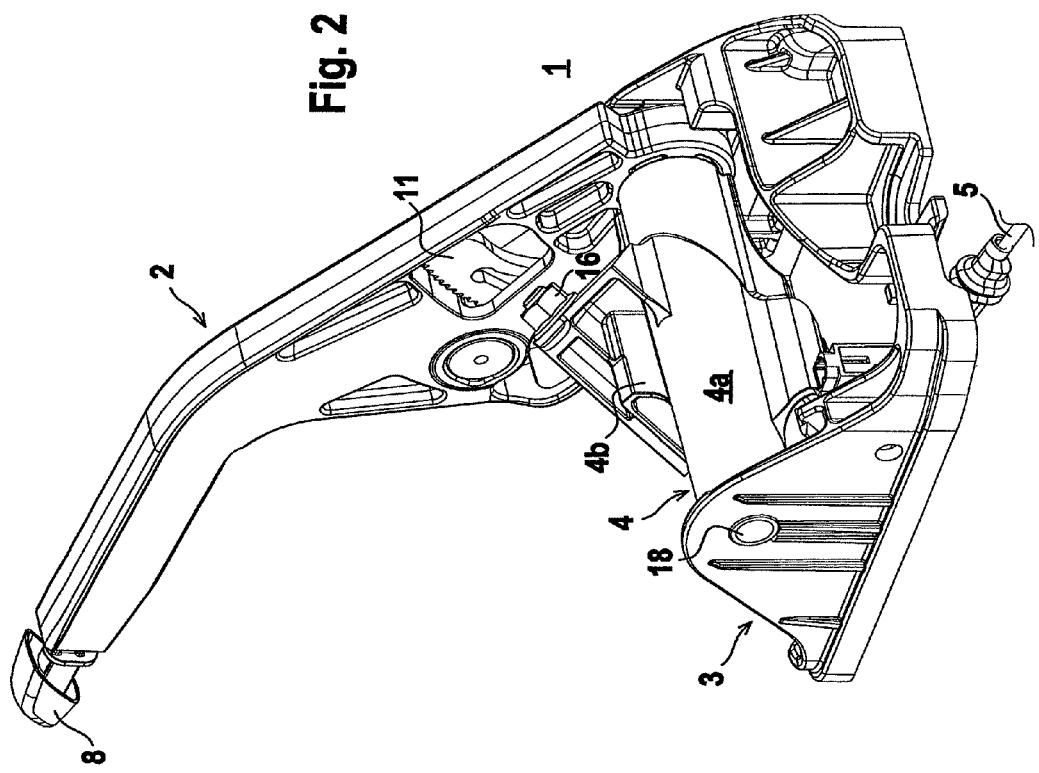
FIG. 2: A second view of the operating mechanism shown in FIG. 2.

FIGS. 1 and 2 show an exemplary embodiment of the operating mechanism 1 according to the invention, which is used for a parking brake on a vehicle and in particular a motor vehicle.

The operating mechanism 1 is provided with a manual brake lever 2 which is attached pivoting to a bearing block 3. The bearing block 3 includes at least one cast part, wherein the cast part is preferably composed of a light metal alloy.

The manual brake lever 2 is embodied integrally and is also embodied as a cast part, wherein this cast part is also composed of a light metal alloy. Aluminum-alloys or magnesium alloys are preferably used for the bearing block 3 as well as for the manual brake lever 2. The manual brake lever 2 is positioned around a horizontally extending pivoting axis, wherein the manual brake lever 2 is attached to a tubular holder 4 to which a transmission element 5 is also attached.

The respective position of the manual brake lever 2 is transmitted via this transmission element 5 to the vehicle parking brake which is not shown herein. The transmission element 5 in the present case is embodied as a rope or cord, but can alternatively also be embodied as a cable or a rod.

The manual brake lever 2 comprises a guide 6 with a displaceable activation rod 7 located inside. In the embodiment shown, the activation rod 7 is a rod-shaped plastic part. The guide 6 is embodied as a U-shaped profile, with its open side exposed on one side of the manual brake lever 2. By arranging the opening of the U-shaped profile on the side, the activation rod 7 can be inserted from the side into this guide.

A push button 8 is fitted onto the front end of the activation rod 7, which projects over the guide 6, and is secured thereon with the aid of locking means and the like.

The activation rod 7 is connected to a locking device 9, wherein this locking device 9 can be used to lock the manual brake lever 2 in a predetermined pivoting position.

The locking device 9 may comprise a detent 10 and a locking segment 11. The locking segment 11 is attached to the bearing block 3 and is provided with a strip and detent teeth 12.

The detent 10 is positioned on a pivot bearing 13 on the manual brake lever 2, so as to pivot around a horizontally extending pivoting axis, and is pre-tensioned via a spring element 14.

The pivoting axis extends through the center of the detent 10 and divides this detent into pivoting arms extending on both sides of the pivoting axis. The first pivoting arm of the detent 10 is connected to the activation rod 7. The second pivoting arm of the detent 10 engages in the locking segment 11. For this, the detent 10 is provided on the front end of the second pivoting arm with a latching nose which can be made to engage into the detent teeth 12 of the locking segment 11.

The activation rod 7 is prevented from moving out of the guide with the aid of a guide clip 15 as well as the connection between the detent 10 and the activation rod 7.

To release the detent 10 from the locking segment 11, the push button 8 is depressed. As a result, the activation rod 7 is displaced and the detent 10 released counter to the spring force of the spring element 14 from the locking segment 11.

Figure 3:
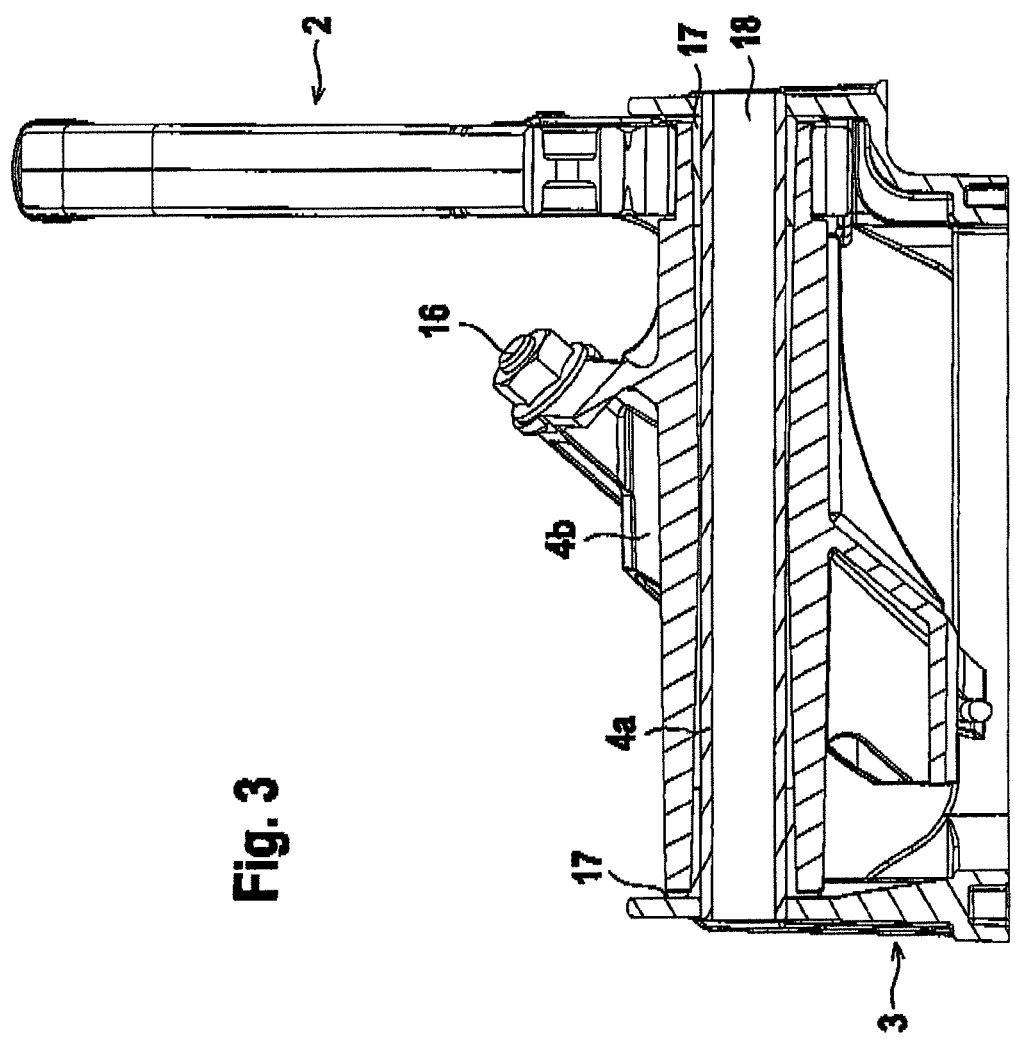
FIG. 3: A partial sectional view of the arrangement shown in FIG. 2.

The design and function of the tubular holder 4 can be seen in particular in FIGS. 2 and 3. The tubular holder 4, which may also comprise a light metal alloy in the same way as the manual brake lever 2 and the bearing block 3, is provided in addition to the hollow-cylindrical basic body 4a with a formed-on part 4b, in which the transmission element 5 in the form of a traction rope is guided and secured. A screw 16 is provided on one end of the formed-on part 4b as a means for securing the traction rope.

FIG. 3 shows that the tubular holder 4 on the inside has an axially extending cavity with a circular cross-section. FIG. 3 furthermore shows that two bearing bushings 17 are inserted into this cavity. These bearing bushings 17 are secured in their positions on the respective ends of the cavity by horizontal flanges that rest against the longitudinal ends of the tubular holder 4. A bearing tube 18 is inserted into this cavity which is subsequently inserted and secured in bores in the side walls 3a of the bearing block 3, so that the bearing tube 18 is affixed non-rotating to the bearing block 3. As a result, the tubular holder 4 with the attached manual brake lever 2 is thus positioned rotating on the positioning tube 18, wherein a positioning with low friction is achieved when the tubular holder 4 is rotated because of the bearing bushings 17 that glide on the positioning tube 18.

Figure 4:
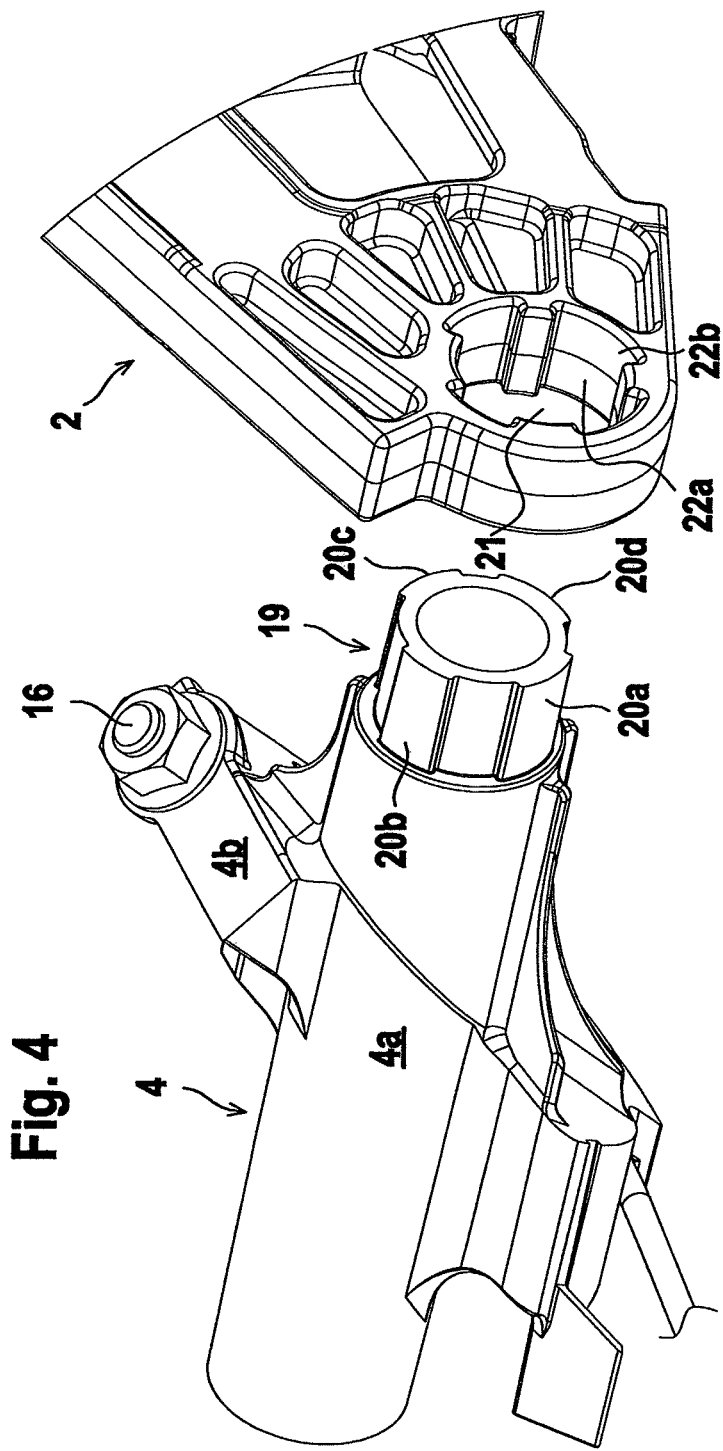
FIG. 4: A detail view of a portion of the manual brake lever and the tubular holder for the operating mechanism according to FIGS. 1 to 3.
Figure 5:
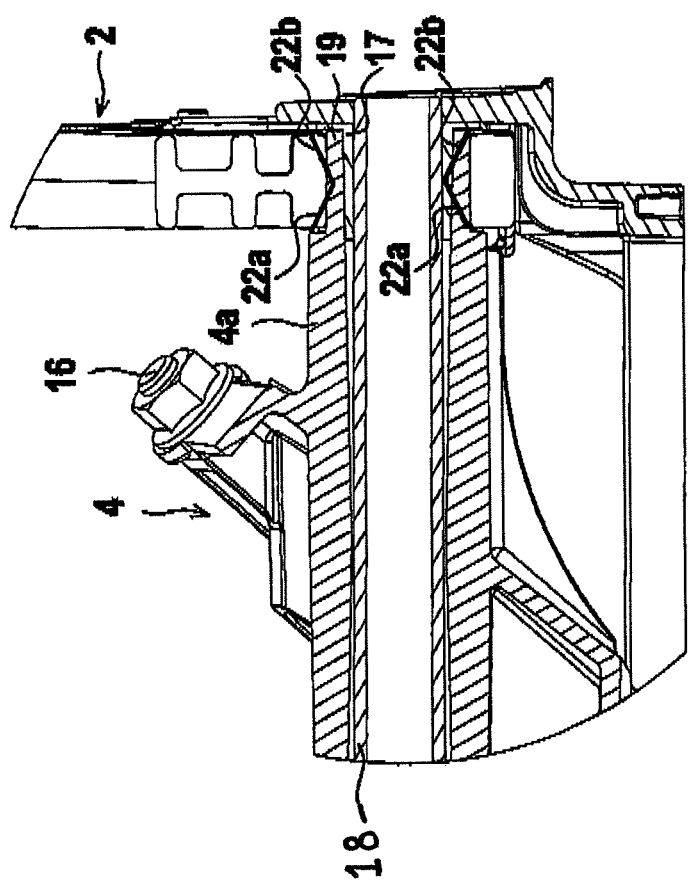
FIG. 5: A partial representation of the manual brake lever pressed onto the tubular holder, shown as a cross-sectional view.

The integrally embodied manual brake lever 2 is attached non-rotating in a predetermined desired position by pressing it onto the tubular holder 4. FIGS. 4 and 5 in particular show the components on the manual brake lever 2 and the tubular holder 4 which are required for the press-fit connection.

On one longitudinal end of its basic body 4a, the tubular holder 4 is provided with a projection 19, also tube shaped, for which the outer surfaces function as press-fit surfaces. The outer surfaces are provided with bevels, such that the outside diameter of the projection 19 is tapered continuously toward its frontal, exposed end.

As can be seen in FIG. 4, the press-fit surfaces are structured such that in circumferential direction of the projection 19, four offset-arranged ribs 20a-d are provided. These ribs 20a-d respectively extend over the total length of the projection 19, wherein the ribs 20a-d have different widths and are arranged at different distances relative to each other.

The manual brake lever 2 is provided with an opening 21 into which the projection 19 of the tubular holder 4 can be pressed. The contour of the opening 21 is accordingly adapted to the contour of the projection 19. The opening 21 is provided for this with bulges that correspond to the individual ribs 20a-d of the projection 19.

Since the ribs 20a-d of the projection 19 are not radially symmetric with respect to the rotational axis of the tubular holder 4 (and accordingly also the bulges on the opening 21 of the manual brake lever 2), the manual brake lever 2 can be pressed onto the projection 19 of the tubular holder 4 in only the desired position.

For the press-fit operation, the inner surface of the opening 21 forms two press-fit edge surfaces 22a, 22b. These two edge surfaces 22a, 22b are slanted relative to each other to form separate press-fit surfaces on each side of the manual brake lever. The edge surfaces 22a, 22b adjoin in the center of the opening 21 and then extend at an angle, mirror-symmetrical to each other, toward the respective outer edges of the opening 21. As a result, the diameter of the opening 21 is smallest at the center and increases toward the respective outer edges.

As a result of the two press-fit surfaces formed by the edge surfaces 22a, 22b, the manual brake lever 2 can be arranged on a tubular holder 4 having the projection 19 located on its right longitudinal end (corresponding to the embodiments shown in FIGS. 1 to 4). In this case, the edge surface 22a is used for the press fit connection with the projection 19 of the tubular holder 4. This variant is used for motor vehicles where the steering wheel is arranged on the left side of the vehicle. The same manual brake lever 2 can also be attached to a tubular holder 4 where the projection 19 is arranged on the left longitudinal end of the tubular holder 4. In that case, the edge surface 22b of the manual brake lever 2 is used for the press fit connection with the projection 19 of the tubular holder 4. This type of embodiment is used for right-steering motor vehicles.

It will be understood that the above description of the present invention is susceptible to various modifications, changes and adaptations, and that the same are intended to be comprehended within the meaning and range of equivalents of the appended claims.

The invention claimed is:

1. An operating mechanism for a parking brake, the operating mechanism comprising:
   a manual brake lever including an opening;
   a tubular holder including a longitudinal end having a projection configured to be press-fit into the opening in the manual brake lever to fix the manual brake lever to the tubular holder;
   wherein the projection includes an outer press-fit surface having a plurality of ribs spaced unevenly about the outer press-fit surface, the plurality of ribs including at least a first rib and a second rib having different widths;
   wherein the opening includes an inner press-fit surface having bulges corresponding to the ribs on the projection, whereby the manual brake lever connects with the tubular holder only in a predetermined orientation;
   wherein the inner press-fit surface defines an axial length defining an axial midpoint, and the inner press-fit surface comprises first and second edge surfaces that adjoin at the axial midpoint of the inner press-fit surface, wherein the first and second edge surfaces slant from the axial midpoint toward opposite sides of the manual brake lever, wherein the diameter of the opening increases from the axial midpoint of the inner press-fit surface toward the opposite sides of the manual brake lever;
   wherein the opening in the manual brake lever is configured to interchangeably fit onto the tubular holder having the projection on a first longitudinal end and the tubular holder having the projection on a second longitudinal end;
   a bearing block, wherein the manual break lever is pivotably coupled to the bearing block by the tubular holder;
   a locking device configured to fix the manual brake lever in a predetermined pivoting position;
   an activation rod guided inside the manual brake lever and operatively connected to the locking device; and
   a transfer element directly connected to the tubular holder, wherein the transfer element is configured to transmit movement of the manual brake lever to the parking brake.

2. The operating mechanism according to claim 1, wherein the manual brake lever comprises a single piece.

3. The operating mechanism according to claim 1, further comprising a bearing tube fixed to the bearing block, wherein the tubular holder is rotatably positioned on the bearing tube.

4. The operating mechanism according to claim 3, further comprising bearing bushings mounting the tubular holder on the bearing tube.

5. The operating mechanism according to claim 1, wherein at least one of the manual brake lever, the bearing block, or the tubular holder is cast from a metal alloy.

6. The operating mechanism according to claim 1, wherein the transfer element comprises at least one of a rope, a cord, a cable, or a rod directly connected to the tubular holder.

* * * * *